(12) United States Patent
Hart et al.

(10) Patent No.: US 12,493,456 B2
(45) Date of Patent: *Dec. 9, 2025

(54) METHODS AND SYSTEMS FOR CONTINUOUS ASYNCHRONOUS CODE DEPLOYMENT

(71) Applicant: Harness Inc., San Francisco, CA (US)

(72) Inventors: Jeffrey Hart, Union City, CA (US); Andrew Backes, San Mateo, CA (US); Alex Bello, San Francisco, CA (US); Isaac Mosquera, San Mateo, CA (US)

(73) Assignee: Harness Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,005

(22) Filed: Feb. 13, 2023

(65) Prior Publication Data

US 2023/0195449 A1    Jun. 22, 2023

Related U.S. Application Data

(63) Continuation of application No. 17/028,691, filed on Sep. 22, 2020, now Pat. No. 11,579,862.

(Continued)

(51) Int. Cl.
*G06F 8/65* (2018.01)
*G06F 9/54* (2006.01)

(52) U.S. Cl.
CPC ............... *G06F 8/65* (2013.01); *G06F 9/546* (2013.01)

(58) Field of Classification Search
None
See application file for complete search history.

(56) References Cited

U.S. PATENT DOCUMENTS 8,458,462 B1 * 6/2013 Hanna ..................... H04L 63/10
726/10
8,825,708 B1 * 9/2014 Sunday ..................... G06F 8/36
707/796

(Continued)

FOREIGN PATENT DOCUMENTS

EP    3128418 A1 * 2/2017 ............... G06F 8/60
KR    20080078431 A * 8/2008
WO    0117250 A1    3/2001

OTHER PUBLICATIONS

International Search Report in International Application No. PCT/US2020/052023, mailed Jan. 12, 2021.

*Primary Examiner* — Philip Wang
*Assistant Examiner* — Rongfa P Wang

(57) ABSTRACT

Systems, methods and computer program products are presented for the automated deployment of a code update to a device. One or more clusters of devices may be connected to a development environment for deployment of one or more code updates through respective development pipelines to the respective clusters of devices. A first cluster of devices receives a module for implementation of an agent for the first cluster of devices and a central queue local to a centralized controller of the development environment. The agent reports at least one status of a respective device to the centralized controller of the development environment, whereby that status may correspond to a code update image pulled onto the respective device. The agent retrieves one or more instruction messages from the centralized controller in response to the reported status of the respective device.

21 Claims, 7 Drawing Sheets

308

Related U.S. Application Data

(60) Provisional application No. 62/904,044, filed on Sep. 23, 2019.

(56) References Cited

U.S. PATENT DOCUMENTS

| | | | |
|---|---|---|---|
| 9,916,233 B1* | 3/2018 | Qureshi | G06F 11/3688 |
| 11,226,887 B1* | 1/2022 | Sharifi Mehr | G06F 11/3006 |
| 11,372,634 B1* | 6/2022 | Gabrielson | H04L 67/1031 |
| 2006/0052985 A1* | 3/2006 | Ito | G01D 9/005 |
| | | | 702/188 |
| 2010/0070961 A1* | 3/2010 | Auer | G06F 8/65 |
| | | | 717/168 |
| 2016/0246586 A1* | 8/2016 | Madanapalli | H04L 67/565 |
| 2017/0180266 A1 | 6/2017 | Frank et al. | |
| 2017/0264523 A1* | 9/2017 | Madgwick | H04L 43/12 |
| 2018/0196741 A1* | 7/2018 | Qureshi | G06F 11/3692 |
| 2018/0324204 A1* | 11/2018 | McClory | G06F 9/5027 |
| 2019/0317754 A1* | 10/2019 | Mosquera | G06F 8/77 |
| 2019/0347422 A1* | 11/2019 | Abadi | G06F 16/9024 |
| 2020/0019318 A1* | 1/2020 | Sakashita | G06F 3/0665 |
| 2020/0169616 A1* | 5/2020 | Chen | H04L 67/55 |
| 2021/0081190 A1* | 3/2021 | Fagiani | H04L 63/168 |
| 2024/0236649 A9* | 7/2024 | Li | H04W 8/18 |

\* cited by examiner

METHODS AND SYSTEMS FOR CONTINUOUS ASYNCHRONOUS CODE DEPLOYMENT

CROSS-REFERENCE TO RELATED APPLICATIONS

This application is a continuation of U.S. Non-Provisional application Ser. No. 17/028,691, filed on Sep. 22, 2020, which claims the benefit of U.S. Provisional Application No. 62/904,044, filed Sep. 23, 2019, which are hereby incorporated by reference in their entirety.

FIELD

The present disclosure relates to methods and systems for deploying software to devices that are not always connected to a network.

BACKGROUND

In current approaches, the deployment strategy of code updates to Internet of Things (IoT) and edge devices is often determined ad hoc based on business rules. IoT refers to physical objects with Internet connectivity, such as connected vehicles, home automation, wearable technology, connected health, devices with remote monitoring capabilities, lighting, heating and air conditioning, media, security systems, and many others. Edge devices refer to devices that are physically located closer to the location where the computation is needed, such as computer systems that are on-premises rather than in a centralized data center. Edge devices may improve response times and reduce bandwidth need. Business rules typically determine when a firmware update is rolled out to IoT and edge devices, such as when a new feature is ready or when a bug is fixed. Some updates are distributed for safety or security related reasons.

When dealing with millions of IoT or edge devices, scaling the deployment is a major consideration. Current software development teams creating code updates for IoT, edge, and other devices that are only periodically connected to a communication network face unique problems. It can be difficult to provide appropriate code to a wide variety of hardware and software configurations to devices with sporadic or limited access to synchronous connections, especially when the devices number in the millions or more. It can also be difficult to collect metadata and other logging data from these not-always-available devices. Statistics regarding the deployment and performance of the software are not readily available to the devops team. The performance of the newly updated version cannot easily be compared with the performance of the prior version to determine if the new version meets performance guidelines or not.

There is a need for asynchronous code deployment systems to provide code updates to IoT and edge devices. It would be advantageous for code to be deployed automatically after it is developed through use of automatic algorithms, rules, and intelligent systems for determining when code should be deployed or rolled back. Moreover, integrations with analytics and software development may be used to provide additional metrics and statistics to human operators about the performance and value added by each deployment.

SUMMARY

Conventional development environments typically rollout code update images through a development pipeline in accordance with a push model. The push model of conventional development environments consumes resources and time for an enterprise developing software at a large scale. As a conventional development environment rolls out code updates to a large number of devices, consistency as to the status of each device prior to, during and after applying the code update may not be uniform. The lack of uniformity requires the conventional development environment to continually retry pushing out code update to various devices that report back code update errors. Some conventional development environments opt for an incremental code update roll out campaign, which requires scheduling and multiple cycles of pushing out code updates.

Systems, methods and computer program products are presented for the automated deployment of a code update(s) to a device(s). The various embodiments described herein provide improvements and advantages over conventional development environments. The various embodiments described herein counteract the deficiencies conventional development environments by implementing an agent within a cluster(s) of devices and a local queue at a centralized controller of a development environment. The agent acts as a proxy between a cluster of devices and the centralized controller to monitor and report back status changes of the respective devices and to deliver instructions from the centralized controller. The agent thereby implements an asynchronous pull model for a roll out campaign of code updates without overriding the underlying push model approach of the development environment itself.

According to various embodiments, one or more clusters of devices may be connected to a development environment for deployment of code updates through respective development pipelines to the respective clusters of devices. A first cluster of devices receives a module for implementation of an agent for the first cluster of devices and implementation of a central queue local to a centralized controller of the development environment. The agent reports at least one status of a respective device to the centralized controller of the development environment, whereby that status may correspond to a code update image pulled onto the respective device. The agent retrieves one or more instruction messages from the centralized controller in response to the reported status of the respective device.

Further areas of applicability of the present disclosure will become apparent from the detailed description, the claims and the drawings. The detailed description and specific examples are intended for illustration only and are not intended to limit the scope of the disclosure.

DETAILED DESCRIPTION

Figure 1A:
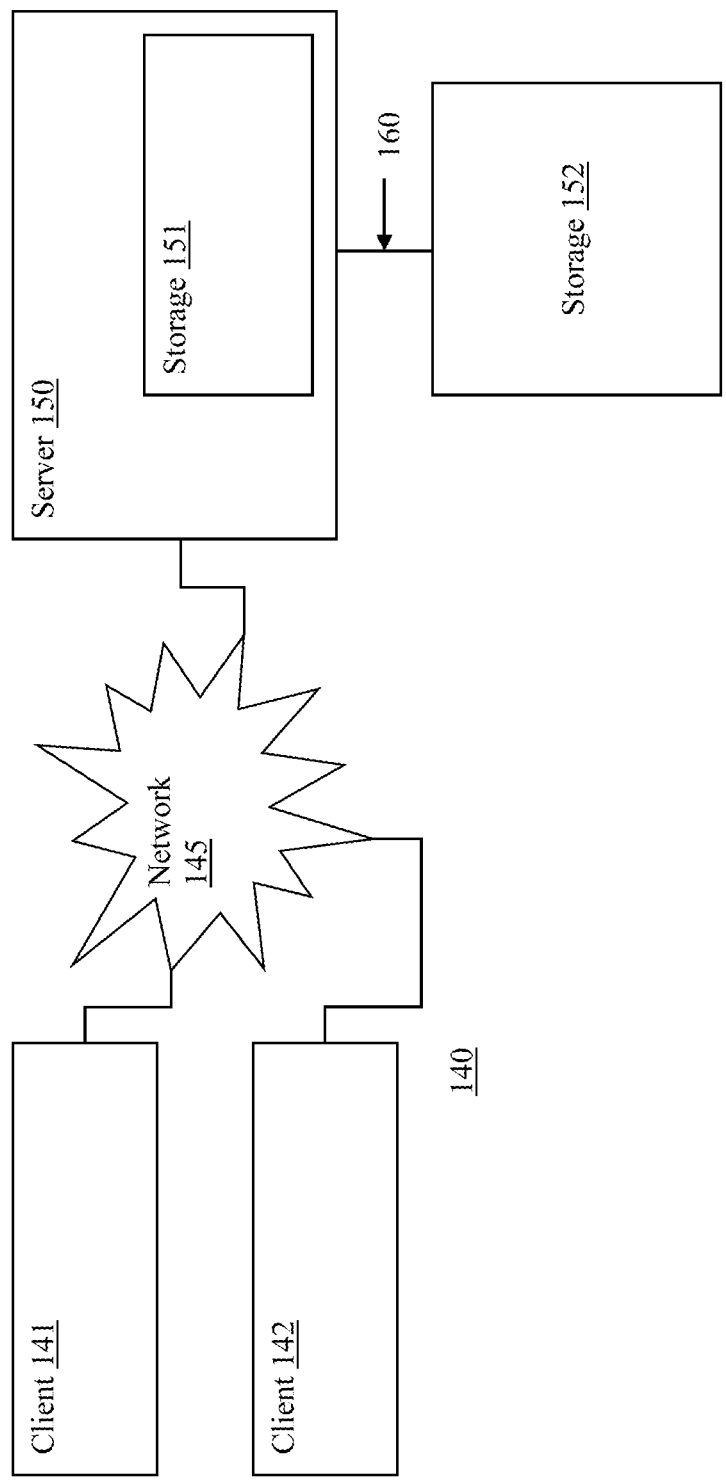
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles and between a base station and one or more control centers as described herein may be executed similarly as the client 141, 142 requests.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle that sends vehicle sensor data used during execution of the method 200 or other method herein. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
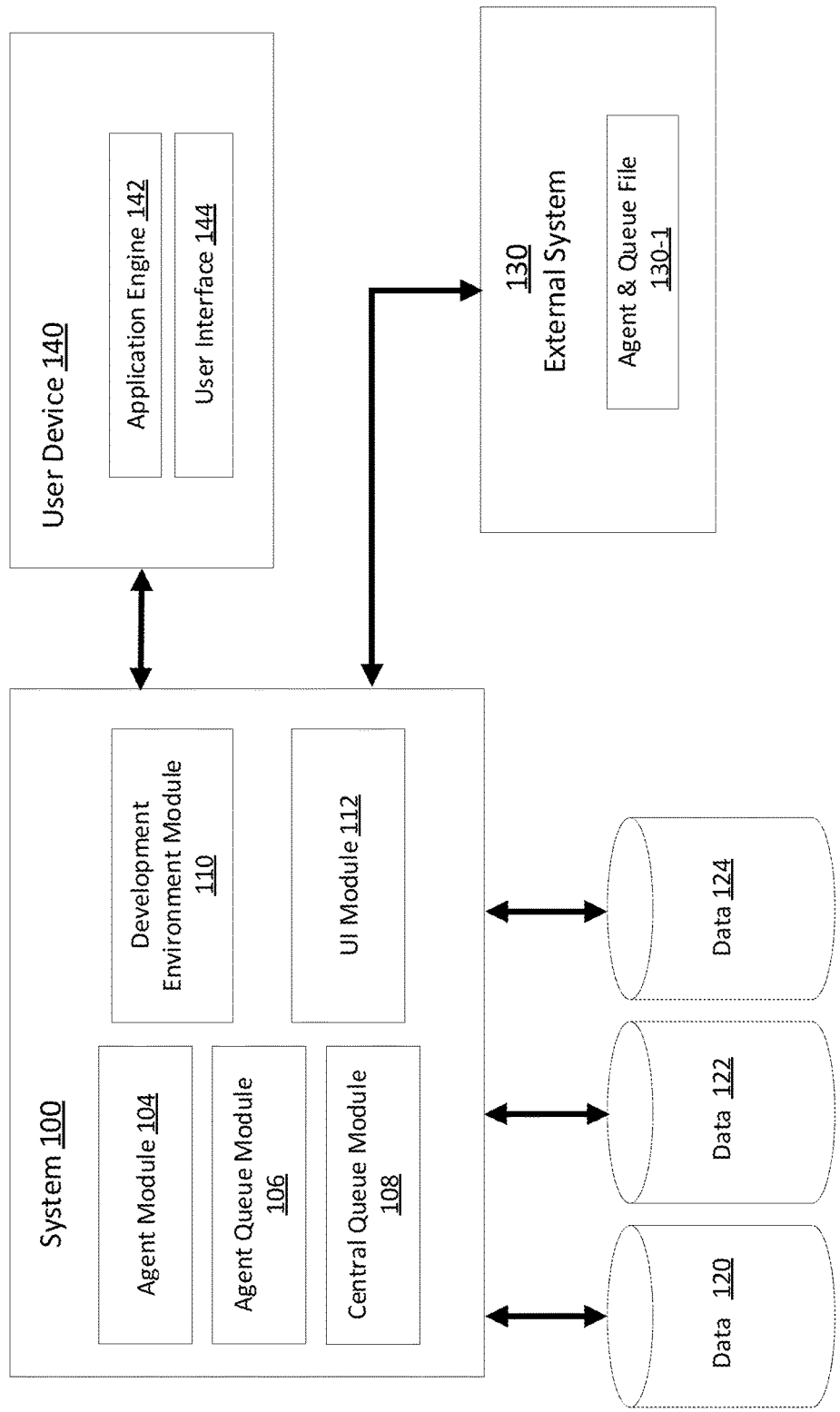
FIG. 1B is a diagram illustrating an exemplary environment in which some embodiments may operate.

FIG. 1B illustrates a block diagram of an example system 100 for various embodiments described here that includes an agent module 104, an agent queue module 106, a central queue module 108, a development environment module 110 and a user interface (UI) module 112. The system 100 may communicate with a user device 140 to display output, via a user interface 144 generated by an application engine 142. The system 100 may communicate with an external system 130 and receive an agent & queue file 130-1 from the external system 130. In some embodiments, the agent & queue file 130-1 may include source code, instructions, data, etc. for implementing an agent, an agent queue and a central queue within a development environment as described herein. For example, the external system 130 may be a cloud-computing platform.

Figure 2:
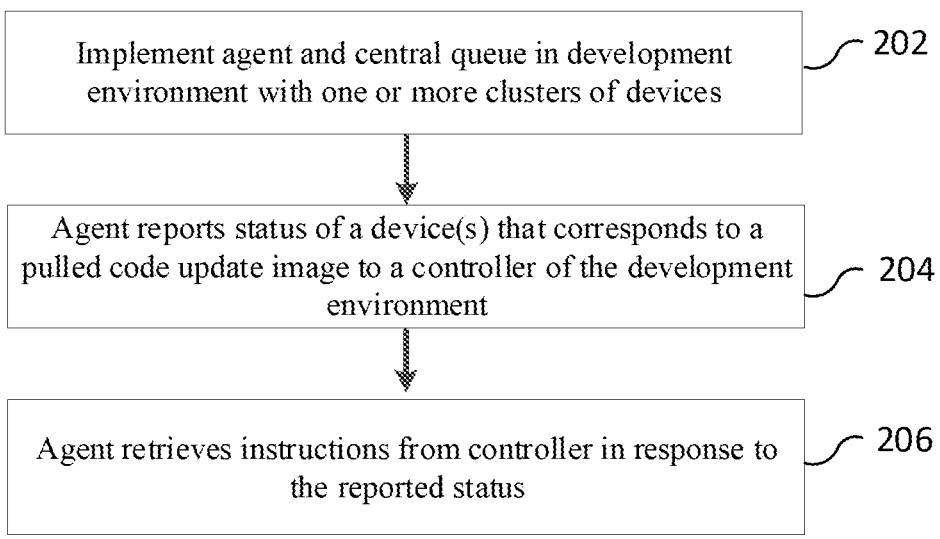
FIG. 2 is a diagram illustrating an exemplary method that may be performed in some embodiments.
Figure 3A:
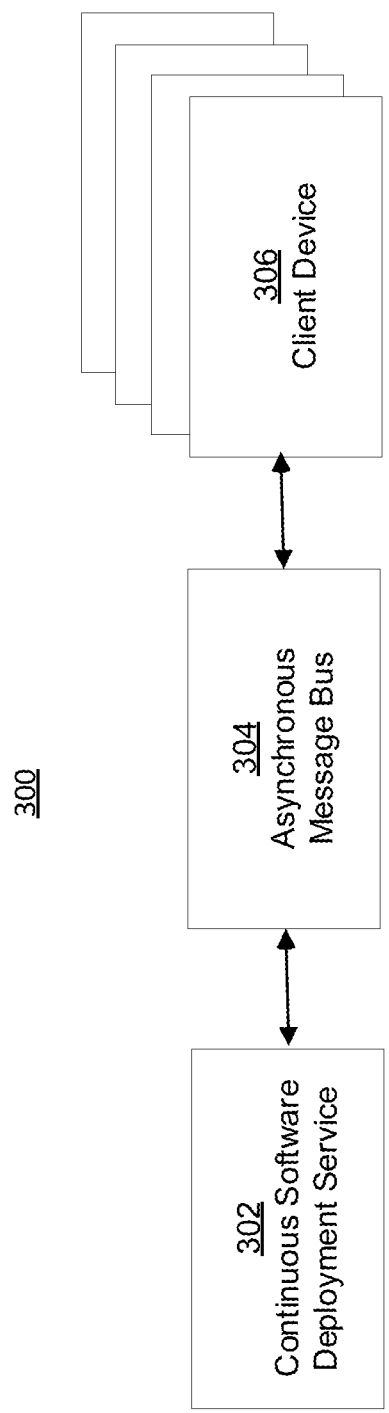
FIG. 3A is a diagram illustrating an exemplary environment in which some embodiments may operate.
Figure 3B:
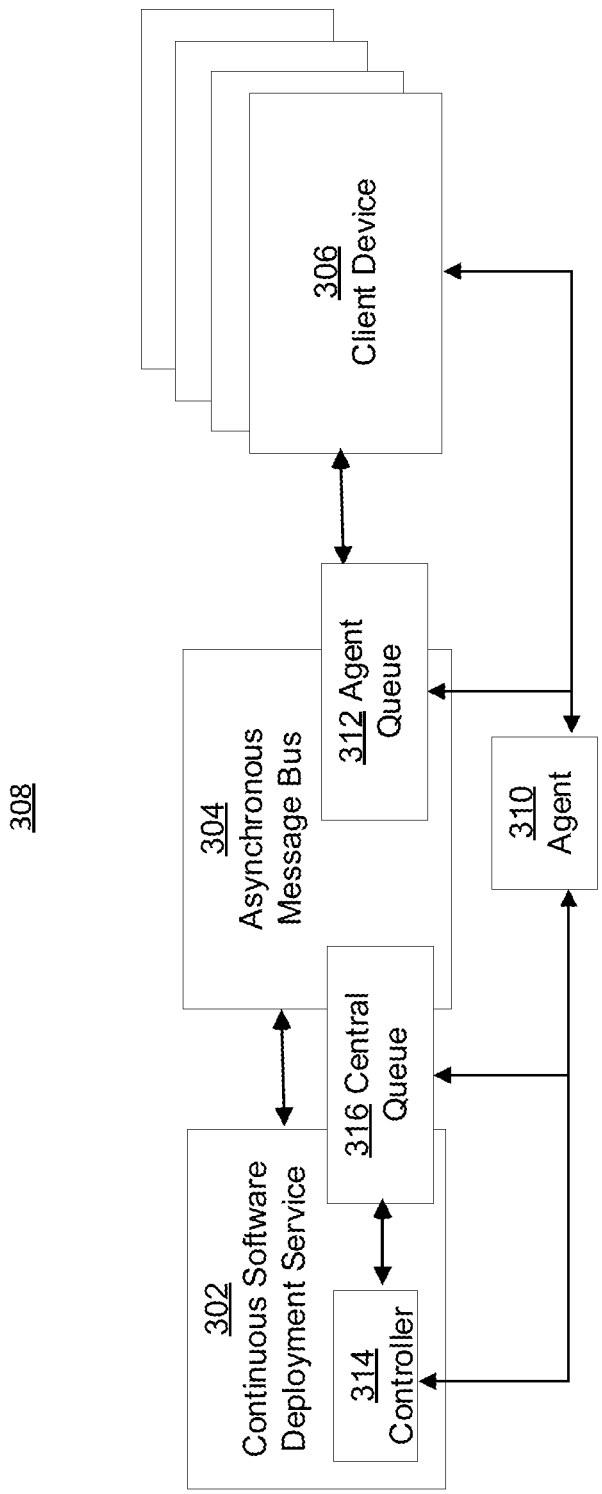
FIG. 3B is a diagram illustrating an exemplary environment in which some embodiments may operate.
Figure 4:
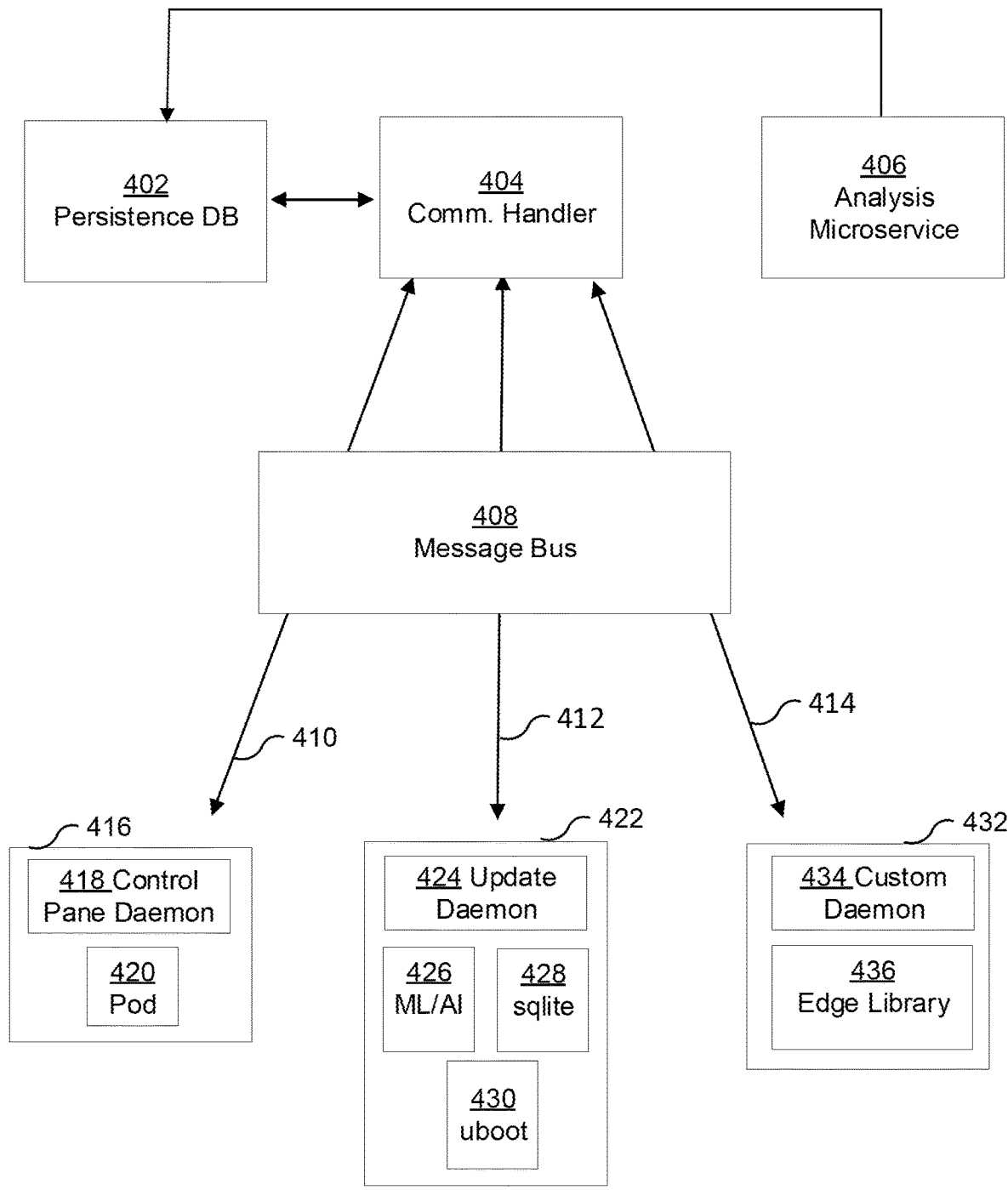
FIG. 4 is a diagram illustrating an exemplary environment in which some embodiments may operate.

The agent module 104 of the system 100 may perform functionality as illustrated and described in FIGS. 2-4.

The agent queue module 106 of the system 100 may perform functionality illustrated and described in FIGS. 2-4

The central queue module 108 of the system 100 may perform functionality illustrated and described in FIGS. 2-4

The development environment module 110 of the system 100 may perform functionality illustrated and described in FIGS. 2-4

The user interface module 112 of the system 100 may display information based on functionality as illustrated and described in FIGS. 2-4

While the databases 120, 122 and 124 are displayed separately, the databases and information maintained in a database may be combined together or further separated in a manner the promotes retrieval and storage efficiency and/or data security.

As shown in the flowchart 200 of FIG. 2, at step 202, an organization may implement a server-based agent by connecting an agent to a first cluster of devices and may implement a central queue local to a centralized controller of a development environment. For example, the development environment may be an open source development environment, such as a Kubernetes development environment. Kubernetes is an open-source container-orchestration system for automating computer application deployment, scaling and management. Kubernetes has functionality for managing containerized workload and services. Information about Kubernetes may generally be found at www.kubernetes.io. In various embodiments, implementing the agent includes connecting an agent queue to an asynchronous message bus to collect status messages sent from respective devices in the first cluster to the centralized controller, whereby the asynchronous message bus enables communication between the first cluster of devices and the centralized controller. In addition, the central queue connects to the asynchronous message bus to enable the agent to collect one or more instructions placed into the asynchronous message bus by the centralized controller. In some embodiments, an authentication process is initiated to provide the agent access to the asynchronous message bus in order to connect the agent queue.

At step 204, the agent reports reporting a status of a respective device(s) to the centralized controller of the development environment. The status corresponds to a code update image (such as a docker image) pulled onto the respective device. In various embodiments, the agent monitors the agent queue to detect a status message resulting from the respective device applying the pulled code update image in order to perform a code update on the respective device. The respective device sends the status message to the asynchronous message bus and thereby is collected at the agent queue. The agent retrieves the status message from the agent queue and sends the status message to the centralized controller.

At step 206, the agent retrieves one or more instruction messages from the centralized controller in response to the reported status of the respective device. In various embodiments, the centralized controller may send the instruction(s) to the respective device in response to the status message from the agent that corresponds to the respective device execution of the code update. The central queue collects the instruction(s) and the agent accesses the instruction(s) at the central queue and forwards the instruction(s) to the respective device.

As shown in diagram 300 of FIG. 3A, a development environment may include a continuous asynchronous code deployment service 302 and an asynchronous message bus 304. The continuous software deployment service 302 provides a message intended for a client device 306 to the asynchronous message bus 304. The client device may be part of a cluster of a plurality of devices and the development environment may have one or more development pipelines to a plurality of clusters of devices to implement a roll out of various code updates.

The continuous software deployment service 302, client device 306, and asynchronous message bus 304 may each be separate devices or pluralities of devices operating in concert. In an embodiment, the continuous software deployment service 302 and asynchronous message bus 304 are each hosted on a plurality of computer servers. The message will define the intended recipient or recipients and include information, instructions, commands, requests, code updates or any other appropriate data. For example, the continuous software deployment service 302 may be providing a firmware update or a code update to a fleet of client devices. The asynchronous message bus 304 stores a copy of the message in a transmit buffer until the intended recipient, such a client device 306, connects to the asynchronous message bus 304 and retrieves the message. The copy of the message may remain stored in the transmit buffer of the asynchronous message bus 304 until the client device 306 initiates a connection to the asynchronous message bus 304 to check for any new code updates. The client device 306 then accesses and downloads the message from the asynchronous message bus 304 and takes action in accordance with the message. The client device 306 may receive a code update in the message, such as a firmware or software update. The code update may comprise an update to binary code, configuration files, or any other computer instructions or data. In some embodiments, the client device 306 may read the message and be directed by the message to retrieve a code update from another, synchronously available source, like an update server, which may be specified by a resource locator such as an IP address or uniform resource locator (URL).

The client device 306 sends messages to the continuous software deployment service 302 by sending a message to the asynchronous message bus 304. The asynchronous message bus 304 stores the message from the client in a receive buffer. The message is retrieved from the receive buffer of the asynchronous message bus 304 by the continuous software deployment service 302. In some embodiments, the continuous software deployment service 302 is continuously connected to the asynchronous message bus 304, which means they are constantly connected other than small amounts of downtime. This may be in contrast to the client device 306, which may only be sporadically connected to the asynchronous message bus 304. That is, in an exemplary embodiment, the client device 306 is not connected to the asynchronous message bus 304 most of the time. The message from the client device 306 may include metadata, logging data, instructions, requests, information about the status of the client device 306, the hardware on the client device 306, the software version, update status, GPS location, or any other appropriate data. The client device 306 may be instructed by the continuous software deployment service 302 to report a current status whenever connected or in response to status changes. In this way, the continuous software deployment service 302 may have the capacity to receive status updates from millions of client devices and obtain data based on a complete view of an entire fleet of millions of client devices in real time, continuously updated in a single system or display. As such, the continuous software deployment service 302 can be aware of which devices are on-line (connected to the network) and which ones are off-line and see their status in real time.

In some embodiments, messages in the asynchronous message bus 304 are deleted after they are delivered to the client device 306 or the continuous software deployment service 302. Moreover, some messages may be broadcast from the continuous software deployment service 302 to a plurality of client devices 106. In some embodiments, messages may be deleted from the asynchronous message bus 304 after a threshold amount of time has elapsed since receipt.

Different deployment strategies can be implemented using this continuous asynchronous code deployment service 302. For example, a canary strategy of sending a code update to a small number of client devices 106 and then tracking their performance to decide if a code update is to be more generally implemented can be automatically managed because of the continuous nature of this asynchronous code deployment service 302.

As shown in diagram 400 of FIG. 3B, an organization that runs a development environment with one or more clusters of devices may receive an agent module from a cloud computing platform. The agent module may be executed within the organization's development environment in order to implement an agent 310, an agent queue 312 and a central queue 316 according to embodiments herein. For example, the agent 310 may implemented with respect to a particular cluster of devices. According to some embodiments, multiple agents may be implemented whereby each agent connects to a different cluster of devices. In such a case, a central queue may be implemented for each different agent or, in the alternation, a single central queue may be implemented and thereby accessed by each different agent.

As illustrated in diagram 308, the client device 306 may belong to a defined cluster of devices which may include a plurality of devices. Each device in the cluster of devices may vary in characteristics which may thereby create inconsistencies with regard to how (or if) each respective device successfully completes execution of a code update rolled out by the continuous asynchronous code deployment service 302. For example, each respective device may have different or varying levels of network connectivity, different types of hardware, different applications, different versions of the same application, different of carrying amounts of available memory, etc.

The agent queue 312 connects to a cluster of devices and the asynchronous message bus 304. The central queue 316 is local to a controller 314 within a centralized system of the continuous asynchronous code deployment service 302. The central queue 316 connects to the controller 314 and the asynchronous message bus 304. In some embodiments, each respective device may pull a code update image (such as a docker image) rolled out by the continuous asynchronous code deployment service 302 and execute the corresponding code update accordingly in the context of the respective device's current resources, applications, hardware and connectivity, etc. According to some embodiments, the agent 310 may detect when the continuous asynchronous code deployment service 302 has initiated roll out of code update images for one or more devices in a cluster of devices and may send instructions to the devices to pull the code update images.

As one or more of the devices in the cluster of devices executes a code update, each respective device may send a status message indicating a status of the code update. For example, a status message may indicate: whether a device was able to retrieve the code update image, whether the device is able to access the code update image, whether the device has enough memory to swap out images, whether the device has the appropriate read/write permissions appropriate for the code update image, whether the code update image requires the device to have access to a resource(s) that is currently unavailable to the device and/or whether the device is not ready to receive data because the successfully implemented code update image needs a certain amount of time to warm up the device's cache.

A respective device 306 in the cluster of devices may send a status message on the asynchronous message bus 304. The agent queue 312 collects the status message and the agent 310 detects the status message in the agent queue 312. The agent 310 retrieves the status message and forwards the status message to the controller 314. In response to the status message, the controller may send one or more instructions for the respective device 306. The controller 314 send an instruction(s) on the asynchronous message bus 304 and the central queue 316 collects the instruction(s) intended for the respective device 306. The agent 310 retrieves the instruction(s) from the central queue 316 and forwards the instruction(s) to the respective device 306.

According to various embodiments, the controller 314 may include an asynchronous message handler, using data provided by a rollout campaign and data analysis microservice and an orchestration engine, such as Spinnaker's Orca. The asynchronous message handler handles communication with the asynchronous message bus 304, both sending and retrieving messages. The asynchronous message handler may receive logging data, receive metadata, or other information from client devices in one or more clusters of device, for example what hardware is present, what software is running or any other appropriate data. The orchestration engine schedules work and manages tasks. In an embodiment, the orchestration engine may send tasks to a daemon on a remote device. The orchestration engine may communicate with the remote device through the asynchronous message bus 304. According to various embodiments, the central queue 316 may connect to the controller 314 in order to have access to the asynchronous message handler. According to various embodiments, with a Kubernetes delivery, the asynchronous communication handler lay downs a set of instructions into a topic on the asynchronous message bus 304, with each instance stored opportunistically. The devices read the topic when they have connectivity, get their set of instructions and take action. For example, the devices may pull code update images from the asynchronous message bus 304.

As shown in diagram 400 of FIG. 4, an asynchronous communication handler 404 of a controller 314 communicates with an orchestration engine and persistence database 402 and an analysis microservice 406 to generate messages that are sent to an asynchronous message bus 408. A persistence database 402 may store state and account information. For representative types of devices 416, 422 and 432, different types of communications 410, 412 and 414 are brokered in manners appropriate to those devices. For an air gapped Kubernetes cluster 416, with a control pane daemon 418 and a pod 420, the asynchronous communication handler 404 may tunnel Kubernetes API commands through the asynchronous message bus 408 in the manner of a normal synchronous rollout. As described herein, outgoing instructions from the asynchronous communication handler 404 to devices 416, 422, 432 may be collected in a central queue 316 and thereby accessed by the agent 310.

For a simple Internet of Things (IoT) device 422 with an IoT software update daemon 424, a uboot 430, an sqlite 428 and an Machine Learning/Artificial Intelligence (ML/AI) Model 426, the exchange of messages may include logs, metadata and command and control instructions. The software update daemon 424 may perform the functions of accessing the asynchronous message bus 408, checking for messages specifying a code update, and downloading and installing the code update. The software update daemon 424 may transmit data to the asynchronous message bus 408 for delivery to the asynchronous communication handler 404, such as logs, metadata, and versioning information. With a CDN Edge Server 432, for example, with a custom daemon 434 and an edge library 436, the asynchronous communication handler 404 may provide command and control and the collection of metadata. The custom daemon 434 may perform the functions of accessing the asynchronous message bus 408, checking for messages specifying a code update, and downloading and installing the code update. In some embodiments, the agent 310 may send an instruction to the custom daemon 434 to check for the code update. The custom daemon 434 may transmit data to the asynchronous message bus 408 for delivery to the asynchronous communication handler 404, such as logs, metadata, and versioning information. The agent queue 312 may collect status messages sent from the custom daemon 434 to be retrieved by the agent 310.

Figure 5:
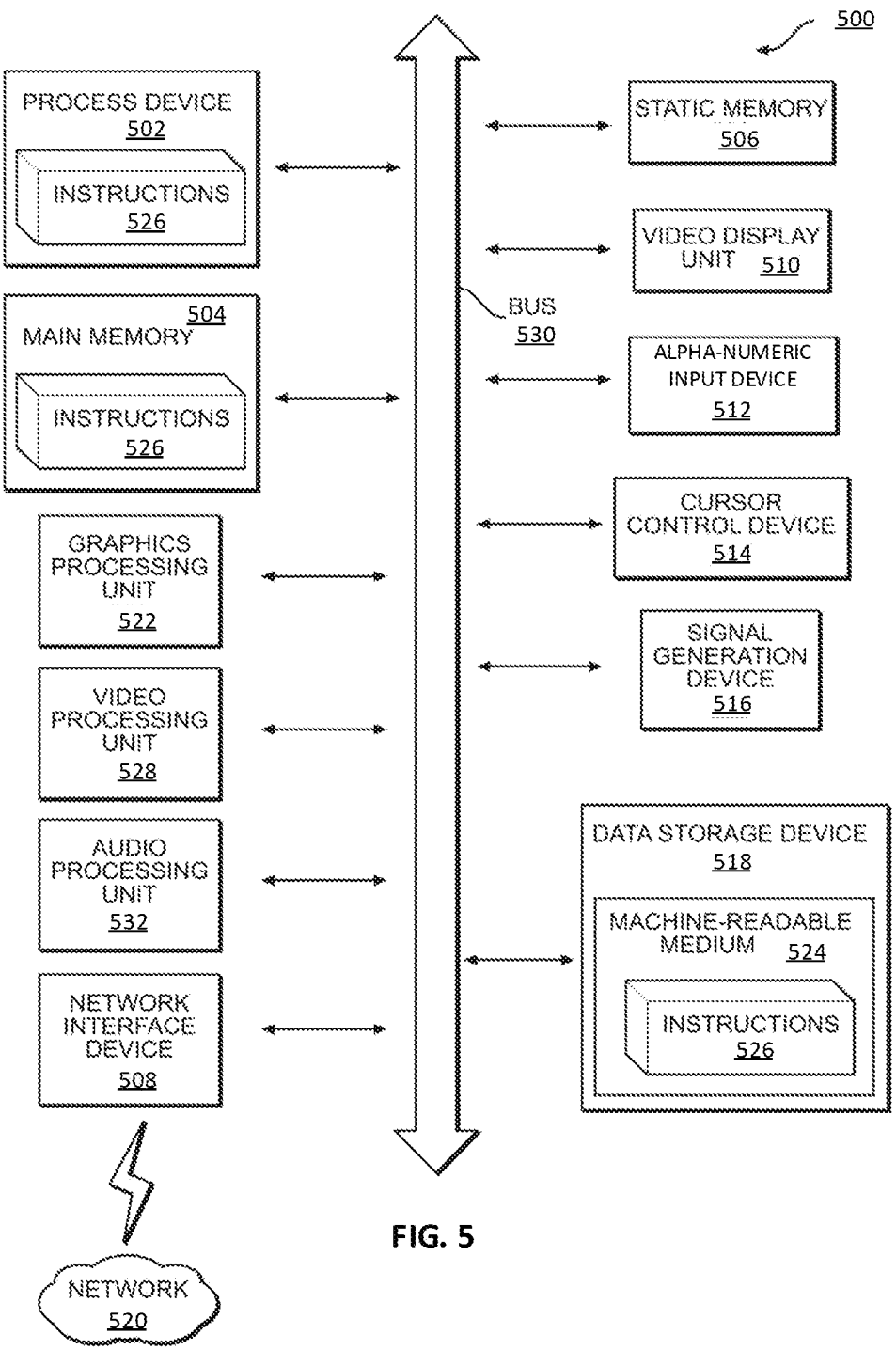
FIG. 5. is a diagram illustrating an exemplary environment in which some embodiments may operate.

FIG. 5 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality corresponding to the components of a device to perform the disclosure herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed:

1. A computer-implemented method comprising:
   implementing an agent within a first cluster of devices connected to a development environment for deployment of one or more code updates through respective development pipelines to one or more clusters of devices,
   wherein implementing the agent includes installing an agent within the first cluster of devices, installing an agent queue that detects messages between each device of the cluster of devices and an asynchronous message bus, and installing a central queue to detect messages transmitted between the asynchronous message bus and a centralized controller within the development environment;
   detecting, by the central queue, a code update image generated by the centralized controller and to be provided to a first device of the cluster of devices by the centralized controller through an asynchronous message bus;
   retrieving, by the agent, the code update image from the central queue;
   providing the retrieved code update image to the first device by the agent;
   reporting, by the agent, at least one status of the first device to the centralized controller of the development environment, the at least one status corresponding to a code update image pulled onto the first device, wherein the centralized controller includes an asynchronous message handler that receives data from the each device of the cluster of devices, the data describing what hardware is present or what software is running on a respective device; and
   retrieving, by the agent, one or more instruction messages from the centralized controller in response to the reported status of the respective device.

2. The computer-implemented method of claim 1, further comprising:
   authenticating the agent to provide the agent access to connect the agent queue to the asynchronous message bus.

3. The computer-implemented method of claim 1, further comprising:
   accessing, by the agent, instructions from the central queue and forwarding the instructions to one of the respective cluster of devices.

4. The computer-implemented method of claim 1, further comprising:
   connecting the central queue to an asynchronous message bus to enable the agent to collect the one or more instructions that have placed into the asynchronous message bus by the centralized controller.

5. The computer-implemented method of claim 4, wherein the asynchronous message bus enables communication between the cluster of devices and the centralized controller.

6. The computer-implemented method of claim 1, wherein implementing the agent comprises:
   connecting the agent queue to an asynchronous message bus to collect status messages sent from the cluster of devices to the centralized controller.

7. The computer-implemented method of claim 1, further comprising:
   connecting a central queue local to the centralized controller to the asynchronous message bus to enable the agent to collect one or more instructions placed into the asynchronous message bus by a centralized system.

8. A system comprising one or more processors, and a non-transitory computer-readable medium including one or more sequences of instructions that, when executed by the one or more processors, cause the system to perform operations comprising:
   implementing an agent within a first cluster of devices connected to a development environment for deployment of one or more code updates through respective development pipelines to one or more clusters of devices,
   wherein implementing the agent includes installing an agent within the first cluster of devices, installing an agent queue that detects messages between each device of the cluster of devices and an asynchronous message bus, and installing a central queue to detect messages transmitted between the asynchronous message bus and a centralized controller within the development environment;
   detecting, by the central queue, a code update image generated by the centralized controller and to be provided to a first device of the cluster of devices by the centralized controller through an asynchronous message bus;
   retrieving, by the agent, the code update image from the central queue;
   providing the retrieved code update image to the first device by the agent;
   reporting, by the agent, at least one status of the first device to the centralized controller of the development environment, the at least one status corresponding to a code update image pulled onto the first device, wherein the centralized controller includes an asynchronous message handler that receives data from the each device of the cluster of devices, the data describing what hardware is present or what software is running on a respective device; and retrieving, by the agent, one or more instruction messages from the centralized controller in response to the reported status of the respective device.

9. The system of claim 8, further comprising the operations of:

authenticating the agent to provide the agent access to connect the agent queue to an asynchronous message bus.

10. The system of claim 8, further comprising operations of:

accessing, by the agent, instructions from a central queue and forwarding the instructions to one of the respective devices.

11. The system of claim 8, further comprising operations of:

connecting the central queue to an asynchronous message bus to enable the agent to collect the one or more instructions that have placed into the asynchronous message bus by the centralized controller.

12. The system of claim 11, wherein the asynchronous message bus enables communication between a first cluster of devices and the centralized controller.

13. The system of claim 8, wherein implementing the agent comprises:

connecting an agent queue to an asynchronous message bus to collect status messages sent from a first cluster of devices to the centralized controller.

14. The system of claim 8, further comprising operations of:

connecting a central queue local to the centralized controller to an asynchronous message bus to enable the agent to collect one or more instructions placed into the asynchronous message bus by a centralized system.

15. A computer program product comprising a non-transitory computer-readable medium having a computer-readable program code embodied therein to be executed by one or more processors, the program code including instructions to perform operations of:

implementing an agent within a first cluster of devices connected to a development environment for deployment of one or more code updates through respective development pipelines to one or more clusters of devices, wherein implementing the agent includes installing an agent within the first cluster of devices, installing an agent queue that detects messages between each device of the cluster of devices and an asynchronous message bus, and installing a central queue to detect messages transmitted between the asynchronous message bus and a centralized controller within the development environment;

detecting, by the central queue, a code update image generated by the centralized controller and to be provided to a first device of the cluster of devices by the centralized controller through an asynchronous message bus;

retrieving, by the agent, the code update image from the central queue;

providing the retrieved code update image to the first device by the agent;

reporting, by the agent, at least one status of the first device to the centralized controller of the development environment, the at least one status corresponding to a code update image pulled onto the first device, wherein the centralized controller includes an asynchronous message handler that receives data from the each device of the cluster of devices, the data describing what hardware is present or what software is running on a respective device; and retrieving, by the agent, one or more instruction messages from the centralized controller in response to the reported status of the respective device.

16. The computer program product of claim 15, further comprising the operations of:

authenticating the agent to provide the agent access to connect the agent queue to an asynchronous message bus.

17. The computer program product of claim 15, further comprising operations of:

accessing, by the agent, instructions from a central queue and forwarding the instructions to one of the respective devices.

18. The computer program product of claim 15, further comprising operations of:

connecting the central queue to an asynchronous message bus to enable the agent to collect the one or more instructions that have placed into the asynchronous message bus by the centralized controller.

19. The computer program product of claim 18, wherein the asynchronous message bus enables communication between a first cluster of devices and the centralized controller.

20. The system of claim 15, wherein implementing the agent comprises:

connecting an agent queue to an asynchronous message bus to collect status messages sent from a first cluster of devices to the centralized controller.

21. The computer program product of claim 15, further comprising operations of:

connecting a central queue local to the centralized controller to an asynchronous message bus to enable the agent to collect one or more instructions placed into the asynchronous message bus by a centralized system.

* * * * *